United States Patent
May et al.

(10) Patent No.: US 7,930,651 B2
(45) Date of Patent: Apr. 19, 2011

(54) AGENDA DISPLAY IN AN ELECTRONIC DEVICE

(75) Inventors: Darrell R. May, Waterloo (CA); Robert Edwards, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 612 days.

(21) Appl. No.: 11/624,269

(22) Filed: Jan. 18, 2007

(65) Prior Publication Data

US 2008/0178100 A1    Jul. 24, 2008

(51) Int. Cl.
G06F 15/00 (2006.01)
H04B 1/38 (2006.01)
(52) U.S. Cl. .................................. 715/864; 715/963
(58) Field of Classification Search .................. 715/840, 715/802, 804, 805, 821–824, 841–844, 810–817, 715/963, 968, 864, 853–854, 705, 708, 712; 455/556.2, 566; 705/9, 7, 8; 709/206
See application file for complete search history.

(56) References Cited

U.S. PATENT DOCUMENTS

| | | | |
|---|---|---|---|
| 2,144,612 A | 1/1939 | Leighton | |
| 2,198,600 A | 4/1940 | Britton | |
| 3,061,615 A | 10/1962 | Viriot | |
| 3,865,886 A | 2/1975 | Schindler | |
| 4,496,753 A | 1/1985 | Kwon | |
| 4,634,784 A | 1/1987 | Nagato | |
| 4,973,763 A | 11/1990 | Jakobson | |
| 5,247,438 A * | 9/1993 | Subas et al. | 700/90 |
| 5,344,945 A | 9/1994 | Grunchard | |
| 5,528,745 A | 6/1996 | King et al. | |
| 5,692,125 A | 11/1997 | Schloss et al. | |
| 5,790,974 A * | 8/1998 | Tognazzini | 455/456.5 |
| 6,016,478 A | 1/2000 | Zhang et al. | |
| 6,072,076 A | 6/2000 | Schmidt | |
| 6,073,110 A * | 6/2000 | Rhodes et al. | 705/8 |
| 6,288,248 B1 | 9/2001 | Strebelle | |
| 6,310,634 B1 * | 10/2001 | Bodnar et al. | 715/854 |
| 6,323,883 B1 | 11/2001 | Minoura et al. | |
| 6,684,088 B1 | 1/2004 | Halahmi | |
| 6,818,791 B2 | 11/2004 | Martin | |
| 7,221,800 B2 | 5/2007 | Sesek et al. | |
| 7,278,092 B2 | 10/2007 | Krzanowski | |

(Continued)

FOREIGN PATENT DOCUMENTS

CA    2 546 683    6/2005

(Continued)

OTHER PUBLICATIONS

Carre, et. al. Memoires Presentes A La Societe Chimique, 1931, No. 89, 1150-1155.

(Continued)

*Primary Examiner* — Steven P Sax
(74) *Attorney, Agent, or Firm* — Perry + Currier, Inc.

(57) ABSTRACT

A method of controlling an electronic device includes retrieving from at least one database of the electronic device, calendared events that meet a set of constraints, displaying the calendared events in a time-ordered list including a start date/time of each of the calendared events, and providing a user-selectable option to either show end times or to hide the end times in the time-ordered list. The time-ordered list includes an end date/time of each of the calendared events when the user-selectable option is set to show end times.

12 Claims, 9 Drawing Sheets

| Calendar Options | |
|---|---|
| Initial View: | Agenda |
| Enable Quick Entry: | Yes |
| Default Reminder: | 15 Min |
| Snooze: | None |
| Start of Day: | 8:00a |
| End of Day: | 6:00p |
| First Day of Week: | Mon |
| Confirm Delete: | Yes |
| Show Free Time in Agenda: | Yes |
| Min. Free Time Displayed: | 15Min |
| Free Time Attribute: | Lighter |
| Show End Time in Agenda | |
| Keep Appointments: | No |
| Show Tasks: | |
| Number of Entries: | 3 |

U.S. PATENT DOCUMENTS

| | | | |
|---|---|---|---|
| 7,307,509 B2 | 12/2007 | Chriss | |
| 7,325,198 B2 | 1/2008 | Adcock et al. | |
| 7,451,158 B1* | 11/2008 | Vogt et al. | 707/102 |
| 7,457,773 B2 | 11/2008 | Schmidt et al. | |
| 7,562,287 B1 | 7/2009 | Goldstein et al. | |
| 7,593,605 B2 | 9/2009 | King et al. | |
| 7,725,530 B2 | 5/2010 | Sah et al. | |
| 2001/0030663 A1 | 10/2001 | Nielsen et al. | |
| 2002/0154178 A1* | 10/2002 | Barnett et al. | 345/853 |
| 2002/0194048 A1* | 12/2002 | Levinson | 705/9 |
| 2003/0018724 A1* | 1/2003 | Mathewson et al. | 709/206 |
| 2003/0078982 A1 | 4/2003 | Ogawa | |
| 2003/0130882 A1 | 7/2003 | Shuttleworth et al. | |
| 2003/0149978 A1* | 8/2003 | Plotnick | 725/39 |
| 2004/0038705 A1 | 2/2004 | Katayama | |
| 2004/0093290 A1* | 5/2004 | Doss et al. | 705/35 |
| 2004/0215472 A1 | 10/2004 | Gleckman | |
| 2005/0120313 A1* | 6/2005 | Rudd et al. | 715/866 |
| 2005/0125737 A1* | 6/2005 | Allen et al. | 715/758 |
| 2005/0131992 A1 | 6/2005 | Goldstein et al. | |
| 2005/0222971 A1* | 10/2005 | Cary | 707/1 |
| 2006/0069604 A1 | 3/2006 | Leukart et al. | |
| 2006/0095859 A1* | 5/2006 | Bocking et al. | 715/764 |
| 2006/0099945 A1* | 5/2006 | Helvick | 455/432.3 |
| 2006/0281489 A1* | 12/2006 | Maack | 455/556.2 |
| 2007/0055561 A1* | 3/2007 | Perrella et al. | 705/9 |
| 2007/0173993 A1* | 7/2007 | Nielsen et al. | 701/35 |
| 2008/0059881 A1 | 3/2008 | Scott et al. | |
| 2008/0059890 A1* | 3/2008 | Zinn et al. | 715/751 |
| 2008/0066018 A1* | 3/2008 | Zinn et al. | 715/866 |
| 2008/0141117 A1 | 6/2008 | King et al. | |
| 2008/0162247 A1* | 7/2008 | Hurmola et al. | 705/9 |
| 2008/0167938 A1 | 7/2008 | Meisels et al. | |
| 2008/0177609 A1 | 7/2008 | Grieb et al. | |

FOREIGN PATENT DOCUMENTS

| | | |
|---|---|---|
| CZ | 294890 | 4/2005 |
| DE | 180668 | 1/1906 |
| DE | 197308 | 11/1906 |
| DE | 197309 | 12/1906 |
| DE | 238341 | 3/1908 |
| DE | 1075103 | 2/1960 |
| DE | 1156773 | 11/1963 |
| DE | 1156774 | 11/1963 |
| EP | 0342140 A2 | 11/1989 |
| EP | 0518765 | 12/1992 |
| EP | 0781760 | 9/2002 |
| EP | 0949559 B1 | 3/2003 |
| EP | 1669914 A1 | 6/2006 |
| FR | 2 862 644 | 11/2003 |
| FR | 2 868 419 | 10/2005 |
| GB | 1913-14767 | 0/1914 |
| GB | 404938 | 1/1934 |
| GB | 467481 | 6/1937 |
| GB | 679536 | 9/1952 |
| GB | 799567 | 8/1958 |
| GB | 984162 | 2/1965 |
| GB | 984633 | 3/1965 |
| GB | 2352846 A | 2/2001 |
| JP | 03056430 | 12/1991 |
| WO | WO 99/32397 | 7/1999 |
| WO | 0054177 A2 | 9/2000 |
| WO | 02/29542 | 4/2002 |
| WO | WO 02092586 | 11/2002 |
| WO | WO 2005/021476 | 3/2005 |
| WO | WO 2005/054167 | 6/2005 |
| WO | 2005076174 A2 | 8/2005 |
| WO | 2005116892 A1 | 12/2005 |
| WO | WO 2006 020234 | 2/2006 |
| WO | WO 2006/100311 | 9/2006 |
| WO | WO 2006/100312 | 9/2006 |
| WO | WO 2006/100313 | 9/2006 |
| WO | WO 2006/100314 | 9/2006 |
| WO | WO 2006/100315 | 9/2006 |
| WO | WO 2006/100316 | 9/2006 |
| WO | WO 2006/100317 | 9/2006 |
| WO | WO 2006/100318 | 9/2006 |
| WO | WO 2006/100319 | 9/2006 |
| WO | WO 2006/100320 | 9/2006 |
| WO | WO 2006/106153 | 10/2006 |
| WO | WO 2006/106154 | 10/2006 |
| WO | WO 2006/106155 | 10/2006 |
| WO | WO 2006/111810 | 10/2006 |

OTHER PUBLICATIONS

Conant et al., Organic Synthesis CV 1, 292-294.
Conant et al., Organic Syntheses CV 1, 294-297.
Gibson, G.P., Chemistry and Industry 1931, 20, 949-975.
Gomez, et al., Tetrahedron Letters 2000, 41, 6049-6052.
Leadbeater, et al., Tetrahedron 2003, 59, 2253-2258.
Viswanathan, et al., Current Science, 1978, vol. 47, No. 21, 802-803.
A. Fauconnier, Bull. Soc. Chim. Fr., No. 50, 1888, pp. 212-214.
Schlama et al., Tetrahedron Letters 1997, vol. 38, No. 20, 3517-3520.
Carius, J., Justus Leibigs Ann. Chem. 1862, 122, 73.
Ren, et al., Organic Letters 2001, vol. 3, No. 23, 3727-28.
Anal. Far. Bioquim., 1930, 1, 8-19. (Abstract).
Milchert et al., Chem. Papers 49(3) 133-136 (1995).
Carra et al., Ind. Eng. Chem. Process Des. Dev., vol. 18, No. 3, 1979, pp. 424-427.
Carra et al., Ind. Eng. Chem. Process Des. Dev., vol. 18, No. 3, 1979, pp. 428-433.
Drozdov, et al. Journal of General Chemistry, (1934), vol. IV, Issue 9, 1305-9.
Lee, Hyung-Woo, et al., "Integrated Multimedia E-mail Handler with Authoring Tool", High Performance Computing on the Information Superhighway HPC Asia, Apr. 28-May 2, 1998, pp. 517-522.
Prasad, Sushil K., et al. "Implementation of a Calendar Application Based on SyD Coordination Links", Parallel and Distributed Processing Symposium, 2003. Proceedings. International Apr. 22-26, 2003, Piscataway, NJ, USA, IEEE, Apr. 22, 2003, pp. 242-249, XP010645361 ISBN: 978-0-7695-1926-5.
Microsoft Corp., Microsoft Outlook Screen Dumps, Microsoft Corp. SP2 edition, Dec. 2003, pp. 1-6.
Canadian Patent Application No. 2,662,013 Office Action dated Jan. 28, 2011.

* cited by examiner

MON, AUG. 14, 2006
*12:47* PM

Messages «

Browser «

Address book «

Tasks «

Calendar «

Profiles «

Settings «

Other «

FIG. 3

| MON, AUG. 14, 2006 |
| --- |
| *12:47 PM* |
| Mon, Aug. 14, 2006 |
| 11:00a -12:00a Department Meeting (Boardroom) 12:00p -1:00p Lunch (Curry) |
| 1:00p -3:00p Free Time |
| 3:00p -5:00p Team Meeting (Room 1A) |
| 5:00p -6:00p Free Time |
| Tue, Aug. 15, 2006 |
| 8:00a -6:00p Free Time |
| Wed, Aug. 16, 2006 |
| 8:00a -6:00p Free Time |

FIG. 5

| MON, AU | New |
| --- | --- |
| *12:4* | |
| Mon, Au | View Week |
| | View Day |
| 11:00a -12:00a D | View Month |
| Meeting ( | |
| 12:00p -1:00p Lu | Options |
| 1:00p -3:00p Fre | Close |
| 3:00p -5:00p Team Meeting (Room 1A) | |
| 5:00p -6:00p Free Time | |
| Tue, Aug. 15, 2006 | |
| 8:00a -6:00p Free Time | |
| Wed, Aug. 16, 2006 | |
| 8:00a -6:00p Free Time | |

FIG. 6

| Calendar Options | |
|---|---|
| Initial View: | Agenda |
| Enable Quick Entry: | Yes |
| Default Reminder: | 15 Min |
| Snooze: | None |
| Start of Day: | 8:00a |
| End of Day: | 6:00p |
| First Day of Week: | Mon |
| Confirm Delete: | Yes |
| Show Free Time in Agenda: | Yes |
| Min. Free Time Displayed: | 15Min |
| Free Time Attribute: | Lighter |
| Show End Time in Agenda: | No |
| Keep Appointments: | 60 Days |
| Show Tasks: | No |
| Number of Entries: | 3 |

FIG. 7

MON, AUG. 14, 2006
*12:47 PM*

Mon, Aug. 14, 2006

11:00a Department Meeting (Boardroom)
12:00p Lunch (Curry)

1:00p Free Time for 2 hours

3:00p Team Meeting (Room 1A)

5:00p Free Time for 1 hour

Tue, Aug. 15, 2006

8:00a Free Time for 10 hours

Wed, Aug. 16, 2006

8:00a Free Time for 10 hours

FIG. 8

Calendar Options

| | |
|---|---|
| Initial View: | Agenda |
| Enable Quick Entry: | Yes |
| Default Reminder: | 15 Min |
| Snooze: | None |
| Start of Day: | 8:00a |
| End of Day: | 6:00p |
| First Day of Week: | Mon |
| Confirm Delete: | Yes |
| Show Free Time in Agenda: | Yes |
| Min. Free Time Displayed: | 15Min |
| Free Time Attribute: | Lighter |
| Show End Time in Agenda | Yes |
| Keep Appointments: | No |
| Show Tasks: | |
| Number of Entries: | 3 |

FIG. 10

AGENDA DISPLAY IN AN ELECTRONIC DEVICE

FIELD OF TECHNOLOGY

The present disclosure relates to calendar applications and to a user aid for determining appropriate time slots in an agenda for scheduling appointments or meetings.

BACKGROUND

Portable electronic devices including, for example, smart telephones and wireless PDAs are becoming increasingly common and typically integrate functions of personal information management such as calendaring and data communications such as email, World Wide Web browsing and telecommunications in a single device. Such devices run on a wide variety of networks from data-only networks such as Mobitex and DataTAC to complex voice and data networks such as GSMIGPRS, CDMA, EDGE, UMTS AND CDMA2000 networks.

Calendar applications permit the user of the portable electronic device to schedule and review calendared events such as appointments and meetings on a visual display such as a liquid crystal display (LCD) screen. Calendared events can typically be viewed in any of a variety of layouts including, for example, a day view, a week view, a month view or an agenda view. An agenda view is typically a list of calendared events with date information, time information, and other identifying information such as subject information in the form of a table, to allow the user to quickly identify the calendared event in the list. Such an agenda is advantageous in that the user is provided with a convenient list of calendared events. This list is convenient for determining scheduled calendared events such as appointment and meetings. However, the list generally includes a start time of each calendared event and is difficult to use to determine an appropriate time of sufficient length that does not conflict with another appointment, in which to schedule new appointments or meetings. To gain a better appreciation of the user's time schedule, the user is forced to switch to a day view, for example, to more quickly determine time available. Still, it is difficult to find appropriate lengths of time in which to schedule new appointments or meetings and such switching between different views is inconvenient for the user of the portable electronic device. It is therefore desirable to provide the user of the portable electronic device with an aid for determining appropriate times for scheduling meetings.

BRIEF DESCRIPTION OF THE DRAWINGS

The embodiments described herein will be better understood with reference to the following Figures, in which:

FIG. 3 is an exemplary menu screen displayed on a display of the portable electronic device of FIG. 1;

FIG. 5 is an exemplary screen showing a list of calendared events displayed on the display of the portable electronic device;

FIG. 6 is an exemplary menu screen showing user options for the calendar application;

FIG. 7 is an exemplary submenu showing further user options for the calendar application;

FIG. 8 is another exemplary screen showing a list of calendared events displayed on the display of the portable electronic device;

FIG. 10 is another exemplary screen showing user-selectable options for the calendar application.

DETAILED DESCRIPTION OF THE EMBODIMENTS

Figure 1:
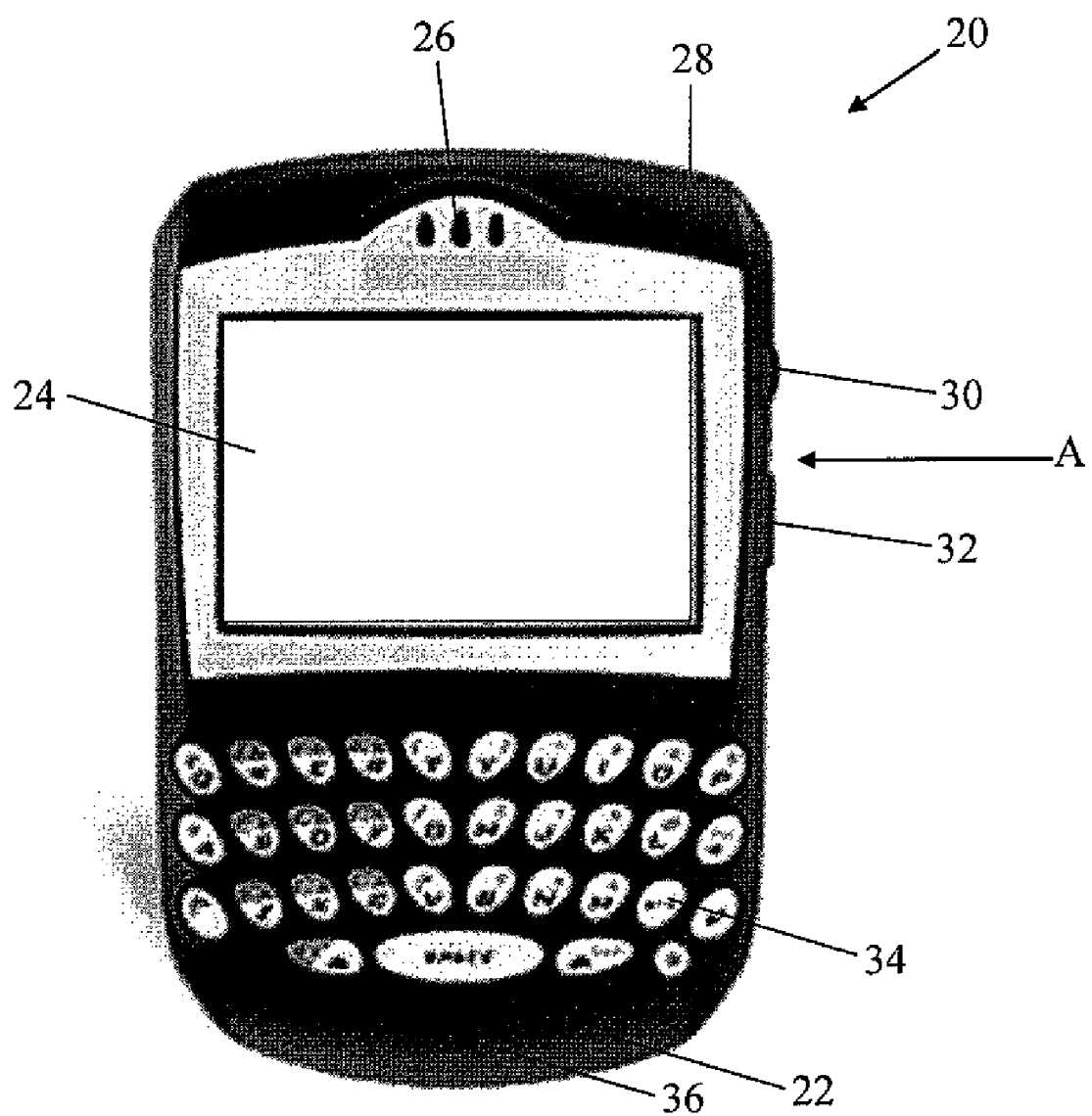
FIG. 1 is a front view of an exemplary portable electronic device.

Referring to FIG. 1, a portable electronic device in accordance with an embodiment is indicated generally by the numeral 20. In the present embodiment, the portable electronic device 20 is based on the computing environment and functionality of a hand-held wireless communication device. It will be understood, however, that the electronic device is not limited to a hand-held wireless communication device. Other electronic devices are possible, such as cellular telephones, smart telephones, and laptop computers. Referring again to the present embodiment, the portable electronic device 20 includes a housing 22 that frames an LCD display 24, a speaker 26, an LED indicator 28, a trackwheel 30, an exit key 32, a key pad 34, and a microphone 36. The trackwheel 30 and the exit key 32 can be inwardly depressed along the path of arrow "A" as a means to provide additional user-input. The housing 22 is made from a suitable material as will occur to those skilled in the art, and can be stored, for example, in a holster (not shown) that includes an attachment for attaching to a user's belt.

Figure 2:
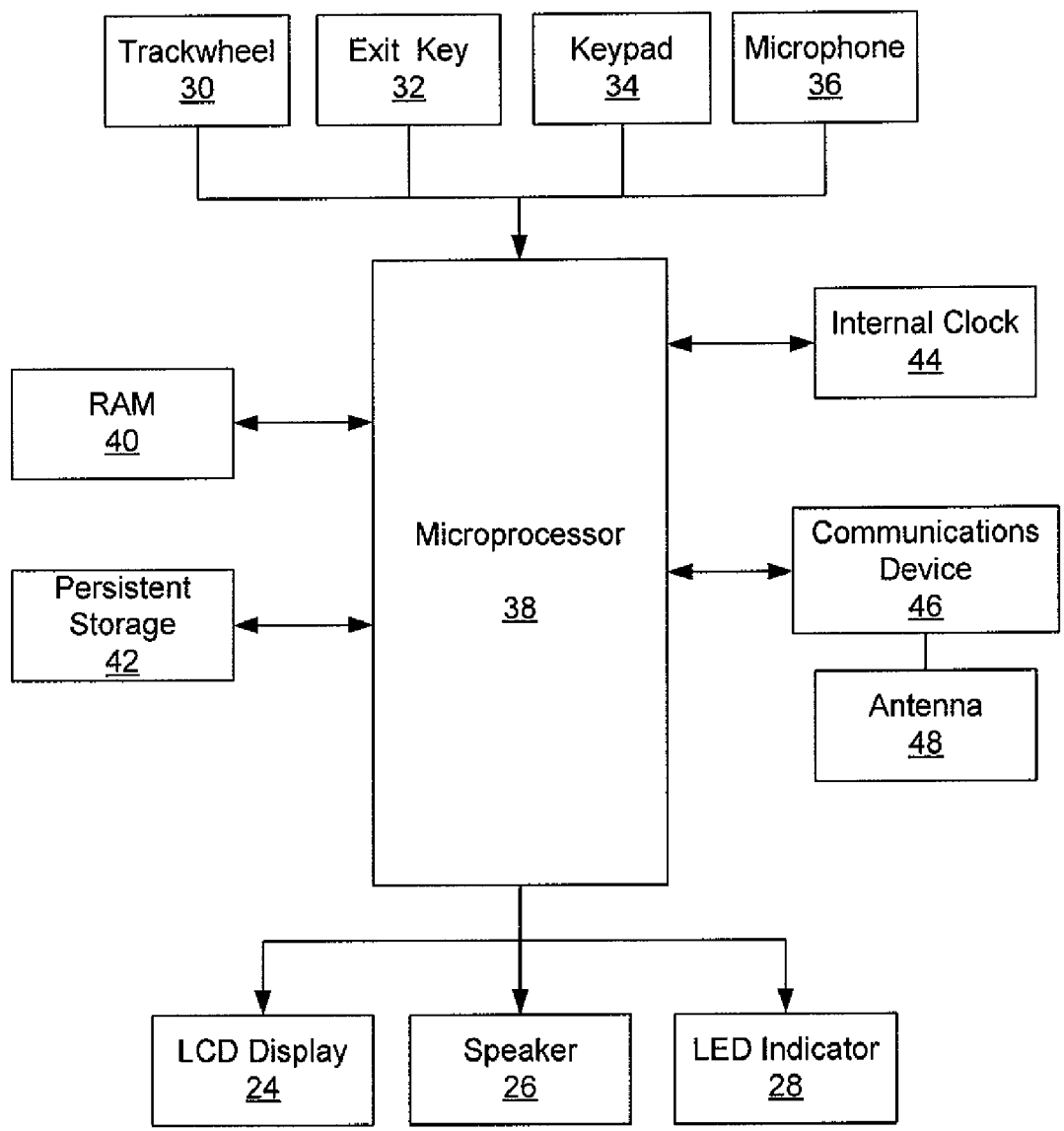
FIG. 2 is a block diagram of certain components, including internal components within the portable electronic device of FIG. 1.

Referring now to FIG. 2, a block diagram of certain components, including internal components within the portable electronic device 20, is shown. The portable electronic device 20 is based on a microcomputer that includes a microprocessor 38 (also referred to herein as a processor) connected to a random access memory unit (RAM) 40 and a persistent storage device 42 that is responsible for various non-volatile storage functions of the portable electronic device 20. Operating system software executable by the microprocessor 38 is stored in the persistent storage device 42, which in the present embodiment is flash memory. It will be appreciated, however, that the operating system software can be stored in other types of memory such as read-only memory (ROM). The microprocessor 38 receives input from various input devices including the trackwheel 30, the exit key 32, and the keypad 34, and outputs to various output devices including the LCD display 24, the speaker 26 and the LED indicator 28. The microprocessor 38 is also connected to an internal clock 44.

In the present embodiment, the portable electronic device 20 is a two-way RF communication device having voice and data communication capabilities. The portable electronic device 20 also includes Internet communication capabilities. Two-way RF communication is facilitated by a communications device 46 that is used to connect to and operate with a data-only network such as Mobitex or DataTAC, or a complex voice and data network such as a GSM/GPRS, CDMA, EDGE, UMTS or CDMA2000 network, via the antenna 48.

Although not shown, a battery provides power to all active elements of the portable electronic device 20.

The persistent storage device 42 also stores a plurality of applications executable by the microprocessor 38 that enable the portable electronic device 20 to perform certain operations including the communication operations referred to above. Other applications software is provided including, for example, an email application, a Web browser application, an address book application, a calendar application, a profiles application, and others.

It will be appreciated that the calendar application is used for providing a graphical user interface (GUI) for the user to create calendared events and for storage of the calendared events in a database at the persistent storage device 42, when executed by the processor 38. The calendar application is also used for displaying calendared events such as appointments, lectures, exams, movies, meetings, performances, dinners, ceremonies, etc. as described below. Each calendared event includes a variety of information including a date and time of the event. The term date/time is used throughout the present description. It will be appreciated that the term date/time refers to time and date or refers to time only, where the date is implicit.

The LCD display 24 of the portable electronic device can be configured by a user to display visual representations of the calendared events stored in a database on the persistent storage device 42. The calendared events are displayed in a user-selected one of various calendar views including a day view, a week view, a month view and an agenda view. The agenda view provides a list of calendared events with date information, time information, and other identifying information such as subject information in the form of a table, to allow the user to quickly identify calendared events in the list.

Referring to FIG. 3, there is shown an exemplary menu screen that is displayed on the LCD display 24 of the portable electronic device 20. The exemplary menu screen includes a display clock that is updated according to the internal clock 44, and a list of applications including an email messaging application, a Web browser an Address book, a Tasks application, and a Calendar application. Each of the displayed applications in the list is selectable by, for example, scrolling to the desired application using the trackwheel 30 and pressing inwardly on the trackwheel 30 in the direction of arrow "A".

Selection of the Calendar application causes execution of the calendar application by the microprocessor 36 and a user-selected one or default one of the calendar views is displayed on the LCD display 24. In the agenda calendar view, a list of calendared events is displayed beginning at the current date according to the internal clock 44. The calendared events scheduled for different days are listed under different day headings, with all calendar events for a specific day listed under the same day heading. The user can scroll ahead in time in the agenda view to show further future calendared events using, for example, the trackwheel 30. Similarly, the user can scroll back in time in the agenda view to show past calendared events using, for example, the trackwheel 30.

Each calendared event in the list includes information such as the start date/time of the calendared event, the end date/time of the calendared event, the subject information relating to the calendared event, and location information relating to the calendared event. It will be appreciated that the list of calendared events is not limited to this information and other information can be presented. For example, rather than displaying the end date/time of the calendared event, the duration of the event may be displayed. Further, the start date/time can be displayed as time only, where the date is implicit. Similarly, the end date/time can be displayed as time only, where the date is implicit. It is also possible that some information such as location information is not included. Also, an indication of whether or not a reminder is set for the calendared event and an indication that the calendared event is a recurring event can be displayed.

Figure 4:
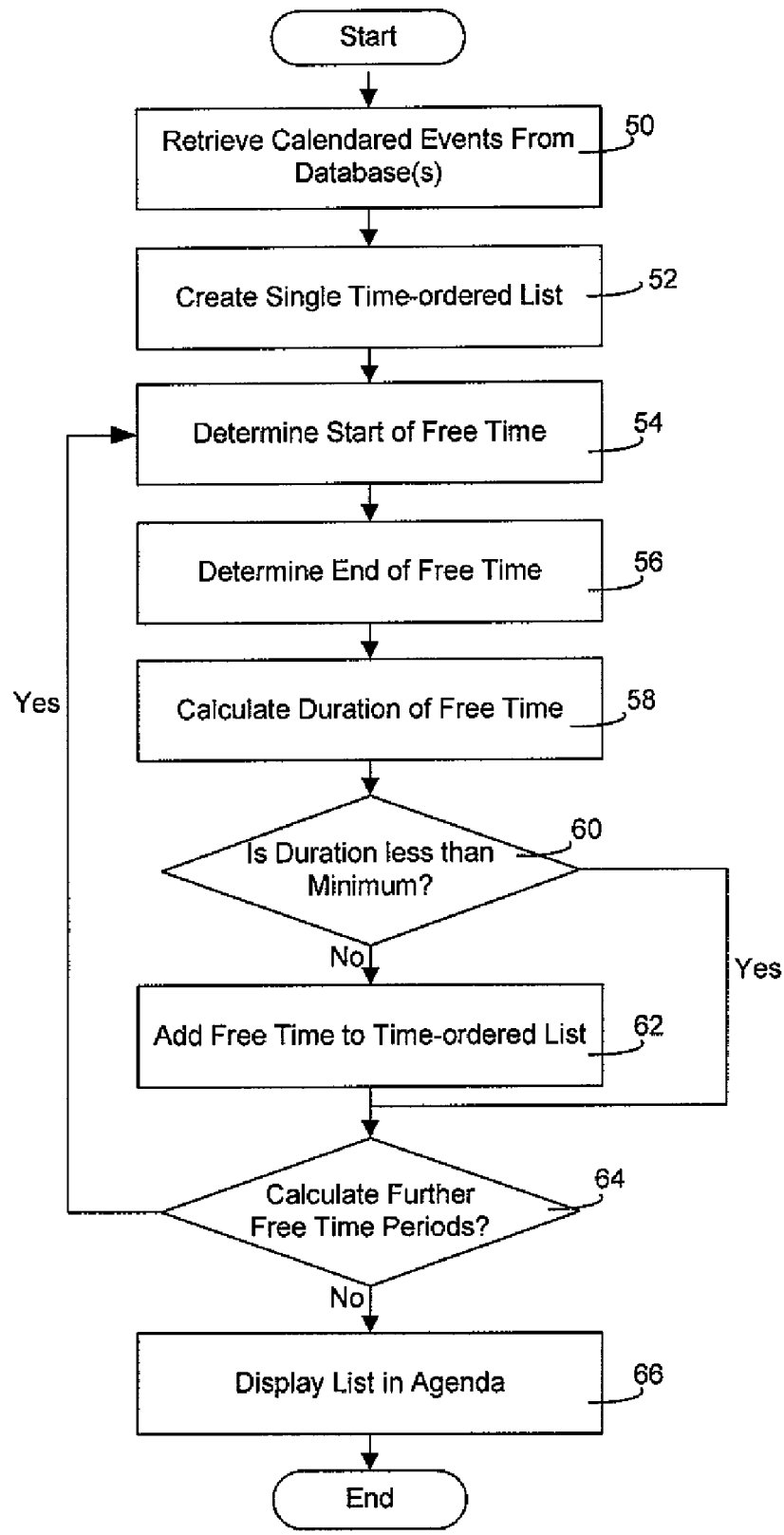
FIG. 4 is a flowchart showing the steps in a method for controlling an electronic device, according to an aspect of an embodiment.

Reference is now made to FIG. 4 to describe an embodiment of the present application. It will be appreciated that each of the steps of FIG. 4 is carried out by routines or subroutines of the calendar software executed by the microprocessor 38. Coding of software for carrying out such steps is well within the scope of a person of ordinary skill in the art. Upon selection of the calendar application from the exemplary menu screen shown in FIG. 3, the microprocessor 38 executes a routine of the calendar application. For the purpose of the present example, the calendar application default view is the agenda view. It will be appreciated, however that the default view can be any view, and the view can be changed from any other view to the agenda view by user selection of an agenda view option in a calendar options menu referred to below.

As indicated above, the agenda view displays a list of calendared events. To display this list, all calendared events that meet specified constraints are retrieved from the database in which the calendared events are stored at the persistent storage device 42 (step 50). The constraints include, for example, a specified number of calendared events that have a start date/time closest to the current date/time according to the internal clock 44. For example, up to a total of 15 calendared events that have the earliest start date/time on or after the current day are retrieved. Thus, if more than 15 calendared events have a start date/time on or after the current day, the calendared events with the earliest start date/times are retrieved. Also, up to 5 calendared events that have a start date/time prior to the current day are retrieved. In this case, the 5 calendared events with the most recent start date/times are retrieved. Alternatively, the constraints include a start date/time or end date/time that falls within a specified time span. For example, all calendared events within a certain time span related to the current day are retrieved. For example, the time span could consist of the current day, the day before the current, and the two days after the current day.

After retrieving the calendared events, a single time-ordered list of calendared events is created, thereby placing each of the calendared events in order of start date/time of the calendared events (step 52).

Next, the start of the next free time period is determined beginning at the user-configured start time of the calendar day for the current date according to the internal clock 44 (step 52). To determine the start date/time of the first free time period, a search is conducted for the first one of the configured start time of a calendar day that does not conflict with a calendared event, the end date/time of a non-conflicting calendared event and the latest end date/time of a set of conflicting calendared events. Thus, if there are no calendared events that start at the configured start time of the calendar day or that are in progress at the configured start time of the calendar day for the current date according to the internal clock, the start date/time of the next free time period is determined to be the configured start time of the calendar day. If, on the other hand, there is a calendared event that starts at the configured start time of the calendar day or that is in progress at the configured start time of the calendar day, the next earliest one of either an end date/time of a non-conflicting calendared event (a calendared event which does not overlap with any other calendared event) or the latest end date/time of a set of conflicting calendared events (a set of calendared events that overlap in time) is determined to be the start date/time of the free time period.

After determining the start date/time of the next free time period, the end date/time of the free time period is determined (step 56). In this case, the first one of a configured end time of a calendar day, the start date/time of a non-conflicting calendared event, and the earliest start date/time of a set of conflicting calendared events is determined. Thus, if there are no further calendar events for the day, the end date/time of the free time period is determined to be the end date/time of the calendar day. On the other hand, if there are other calendared events for the day, the next earliest one of either a start date/time of a non-conflicting calendared event or the earliest start date/time of a set of conflicting calendared events is determined to be the end date/time of the free time period.

The duration of the free time period is then calculated by subtracting the start date/time of the free time period from the end date/time of the free time period (step 58). The duration calculated in step 58 is then compared to a minimum duration (step 60). For any free time periods that are less in duration than the minimum duration or that have an end date/time that is on or before the current dateltime according to the internal clock 44, these time periods are not added to the time-ordered list at step 62. Instead, the process proceeds to step 64. However, for free time periods that are not less in duration than the minimum duration of time and that have an end date/time that is after the current date/time, the free time period is added to the time-ordered list (step 62). Very short free time periods are therefore not displayed. Thus, the time-ordered list that is displayed in an agenda view is not cluttered with very short free time periods that, for example, are too short for scheduling further calendared events within or with past free time periods. It will be appreciated that the minimum duration can be set to zero so that all free time periods are added to the time-ordered list regardless of their durations. Also, the minimum duration can be user-selected in a calendar graphical user interface menu.

At step 64 it is determined if all free time periods that are not less in duration than the minimum duration and fall within a set of constraints have been added to the time-ordered list. In the example in which calendared events that have a start date/time or end date/time that falls within a time span related to the current day, all calendared events are retrieved that have a start date/time or an end date/time that falls within the time span beginning the day before the current day and ending two days after the current day. The free time periods are added that have a start date/time or end date/time that is on or after the current date/time and that fall within the set of constraints defined for the calendared events that are retrieved. In other words, free time periods are determined and added to the time-ordered list from the current date/time until the free time period has a start date/time that falls after the two-day period after the current day.

When all free time periods are determined and all suitable length free time periods are added to the time-ordered list, the time-ordered list is provided to the user of portable electronic device 20 at step 66, thereby providing the user with the free time slots available for scheduling further events.

As indicated above, the user can scroll ahead in time using the trackwheel 30 to view future appointments. When the user scrolls to a point where no further calendared events or free time periods are shown in the agenda view, the process is repeated by retrieving a further set of calendared events that meet a set of constraints. For example, the calendared events that have a start date/time or an end date/time that fall within the next two days (after the two days following the current date/time) are retrieved and put in a time-ordered list (step 52). The remainder of the steps in the process are similar to those already described in reference to FIG. 4.

It will be appreciated that in the present embodiment, free time periods are only shown beginning at the current dateltime according to the internal clock. Free time periods are not shown or calculated for past date/times.

Referring now to FIG. 5, an exemplary agenda view showing a list of calendared events according one embodiment is shown. The start date/time and end datettime for each of the calendared events are displayed on the LCD display 24. Also, the start date/time and end date/time of each of the free time periods are shown. It will be appreciated that the in the present example, the start date/time for each calendared event and for each free time period is displayed as time only. The date for each of the calendared events and free time periods is shown by way of a heading for each day. Similarly, the end date/time for each calendared event and free time period is displayed as time only. Again, the date for each of the calendared events and free time periods is shown by way of a heading for each day. In this example, the free time periods are shown with a different display attribute to allow the user to easily distinguish between the free time periods and the calendared events. In particular, each of the free time periods is shown in a black font rather than a bold font. Other display attributes can be used for display. For example, the free time periods can be shown in a different font, boldness, italics, alternative colour or any other display attribute. It will be appreciated that in the embodiment of FIG. 5, only three calendared events are shown while four free time periods are shown.

For the purpose of the present example, three calendared events are retrieved from the database at step 50 of FIG. 4 and a time-ordered list is created at step 52. The start date/time of the first free time period is then determined at step 54. In this case, the start of the first free time period is determined to be 1:00 PM for Monday Aug. 14, 2006. It will be appreciated that the free time period between 8:00 AM (the configured start time of the calendar day) and 11:00 AM is not shown because the current time according to the internal clock 44 is 12:47 PM and this free time period has an end date/time that is past.

The duration of the free time is calculated at step 58 (and used in the view of FIG. 8, described below). For exemplary purposes, the minimum duration is set at 15 minutes. Since the free time period exceeds in duration the minimum duration (step 60), the free time period is added to the time-ordered list at step 62. Next, it is determined if further free time periods are to be calculated. Using the exemplary time constraint of two days after the current date/time, as described above, further free time periods are determined until the start of the next free time period begins on or after the two-day period after the current date/time. Since only calendared events for the current date are retrieved and shown, the free time period for the day after the current day is determined to extend the full length of the calendar day. Similarly, the free time period for the next day is also determined to extend the full length of the calendar day.

Referring now to FIG. 6, an exemplary menu showing user options for the calendar application is shown. Such a menu is displayed upon user selection. For example, pressing inwardly on the trackwheel 30, in the direction of arrow "A" results in the display of the menu of FIG. 6. The options provided include a New option that, when selected causes the microprocessor to execute a subroutine of the calendar application that provides the user with the GUI for creating and storing calendared events, referred to above. The user is also provided with different display options to change the calendar view from the agenda view shown in FIG. 5 to any one of a week view, a day view and a month view. The user can also choose to close the menu shown in FIG. 6. User selection of any of these options can be carried out, by for example, by scrolling to the desired selection and pressing inwardly on the trackweel 30, in the direction of arrow "A". Upon user selection of Options from the list, the calendar submenu shown in FIG. 7 is displayed, providing further user-selectable options.

In the calendar submenu shown in FIG. 7, several options are provided. As shown, the default view when the calendar application is selected from the exemplary menu screen of FIG. 3 is user-selectable. In the present case, the user selects the Initial View option and is presented with a list (not shown) of Day View, Week View and Month Mew to choose from to set the default view to another calendar view. The Start of Day and End of Day in the calendar views is user-configurable by selecting the Start of Day or End of Day options and using, for example, the trackwheel 30 to change the time listed. It will be appreciated that changing the times listed affects the times determined and shown in FIG. 5. For example, if the Start of Day option is changed to 9:00 a, for 9:00 AM, the free time period shown in the first entry under the date Mon, Aug. 14, 2006 in the agenda view is recalculated and is provided as 9:00 a to 11:00 a Free Time, rather than 8:00 a to 11:00 a Free Time. Similarly, the free time periods determined and provided under the headings Tue, Aug. 15, 2006 and Wed, Aug. 16, 2006 also change. It will be understood that a change to the End of Day also causes a change in the free time determined and provided to the user. Changing either of these options causes the execution of the steps of the method shown in FIG. 4 again to thereby recalculate the free time periods for display on the LCD display 24 of the portable electronic device 20. The font attribute of the free times shown is also configurable by user selection of the Free Time Attribute option followed by scrolling and selection of the displayed attribute of Lighter, Normal, or Bold.

The user is also provided with the option to turn off or on the free time in the agenda view depending on user preferences by toggling between Yes and No in the Show Free Time in Agenda option and can set the minimum duration of a free time period for display by selecting the Min. Duration for Display and using the trackwheel to increase or decrease the number. User selection of the Show End Time in Agenda option is also provided. In the agenda view shown in FIG. 5, the end date/times are shown (displayed as time only, with the dates shown in respective headings). By user selection of the Show End Time in Agenda option and toggling to No, the end date/times of both the calendared events and the free time periods are removed. Instead, the free time periods display the length of the free time period calculated at step 58.

Referring to FIG. 8, an exemplary agenda view showing a list of calendared events according to one embodiment is shown. In the present example, the calendared events shown are identical to those shown in FIG. 5 for comparison purposes. As shown in FIG. 8, the end date/times are not shown for the free time periods or for the calendared events. Thus, the Show End Time in the submenu shown in FIG. 7 is switched to No. Instead, the duration of each of the free time periods is provided, thereby aiding the user with a quick "at a glance" view of the time available.

Figure 9:
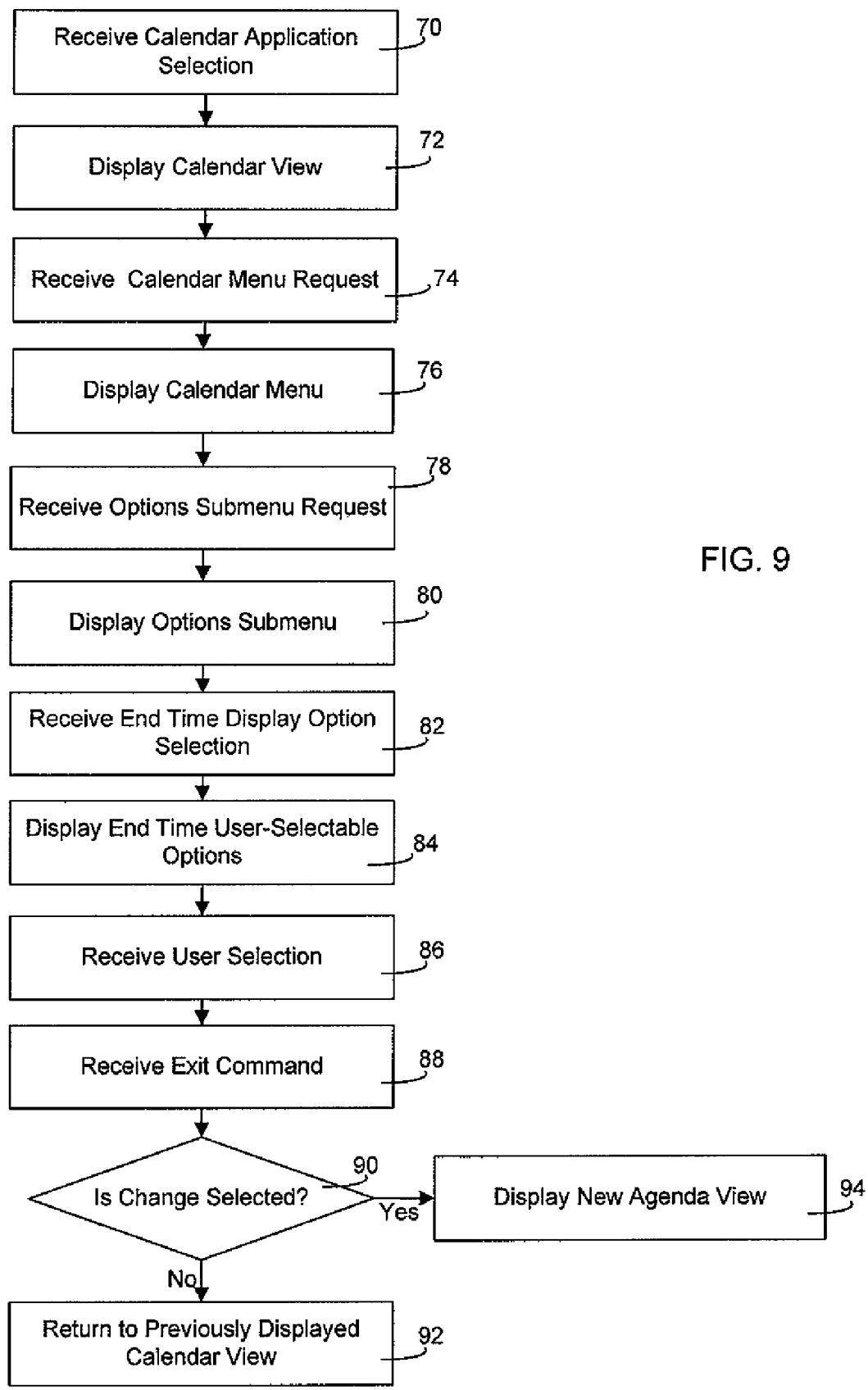
FIG. 9 is a flowchart showing steps in a method for controlling an electronic device according to an aspect of an embodiment.

Reference is now made to FIG. 9 to describe an embodiment of the present application. It will be appreciated that each of the steps of FIG. 9 is carried out by routines or subroutines of the calendar software executed by the microprocessor 38 in response to user interaction. Coding of software for carrying out such steps is well within the scope of a person of ordinary skill in the art. Upon selection of the calendar application from the exemplary menu screen shown in FIG. 3, the microprocessor 38 receives the calendar application selection (step 70) and executes a routine of the calendar application. For the purpose of the present example, the calendar application default view is the agenda view. It will be appreciated, however that the default view can be any view, and the view can be changed from any other view to the agenda view by user selection of an agenda view option in a calendar options menu referred to below. As indicated above, the agenda view displays a time-ordered list of calendared events (step 72), as shown in FIG. 5 and as explained in greater detail in relation to FIG. 4.

In the calendar view, the user requests display of the calendar menu by, for example, pressing inwardly on the trackwheel 30, in the direction of arrow "A", resulting in receipt of a calendar menu request at the microprocessor 38 (step 74). Alternatively, the user may request display of the calendar menu by pressing a menu button on the key pad 34. In response, a calendar menu is displayed on the LCD display 24, such as that shown in FIG. 6. The menu shown in FIG. 6 is shown for exemplary purposes only. The menu options provided include a New option that, when selected by the user, causes the microprocessor to execute a subroutine of the calendar application that provides the user with the GUI for creating and storing calendared events, referred to above. The user is also provided with different display options to change the calendar view from the agenda view shown in FIG. 5 to any one of a week view, a day view and a month view. The user can also choose to close the menu shown in FIG. 6. User selection of any of these options can be carried out, by for example, by scrolling to the desired selection and pressing inwardly on the trackwheel 30, in the direction of arrow "A". Upon user selection of Options from the list, a calendar options submenu request is received at the microprocessor 38 (step 78) and the calendar submenu shown in FIG. 7 is displayed, providing further user-selectable options (step 80).

As indicated above, several user-selectable options are provided in the calendar submenu shown in FIG. 7. One of these options includes the option to Show End Time in Agenda, allowing the user to select between Yes and No options, thereby providing the user with an option to show end times of calendar events (and free time) in the agenda view or to hide the end times of calendar events (and free time). User selection of the Show End Time in Agenda option (step 82) results in the display of two user-selectable options of Yes and No, as shown in FIG. 10 (step 84). User selection of either Yes or No is received (step 86), followed by user exiting of the submenu, for example, by pressing the exit key 32. Upon receipt of the exit command (step 88), the microprocessor 38 determines whether or not a change has been made in the calendar submenu (step 90). In the present example, if no change has been made the previously displayed calendar view is again displayed on the LCD display 24 (step 92). If, on the other hand, a change has been made, the agenda view is reconfigured to incorporate the change (step 94). In the present example, the user changed from a Yes option (to show the end time in the Agenda view) to a No option (to hide the end time in Agenda view). Thus, the agenda view as shown in FIG. 5 is no longer displayed. Instead, the agenda view as shown in FIG. 8 is displayed with the end date/times of the calendar events and free time no longer showing.

Figure 11:
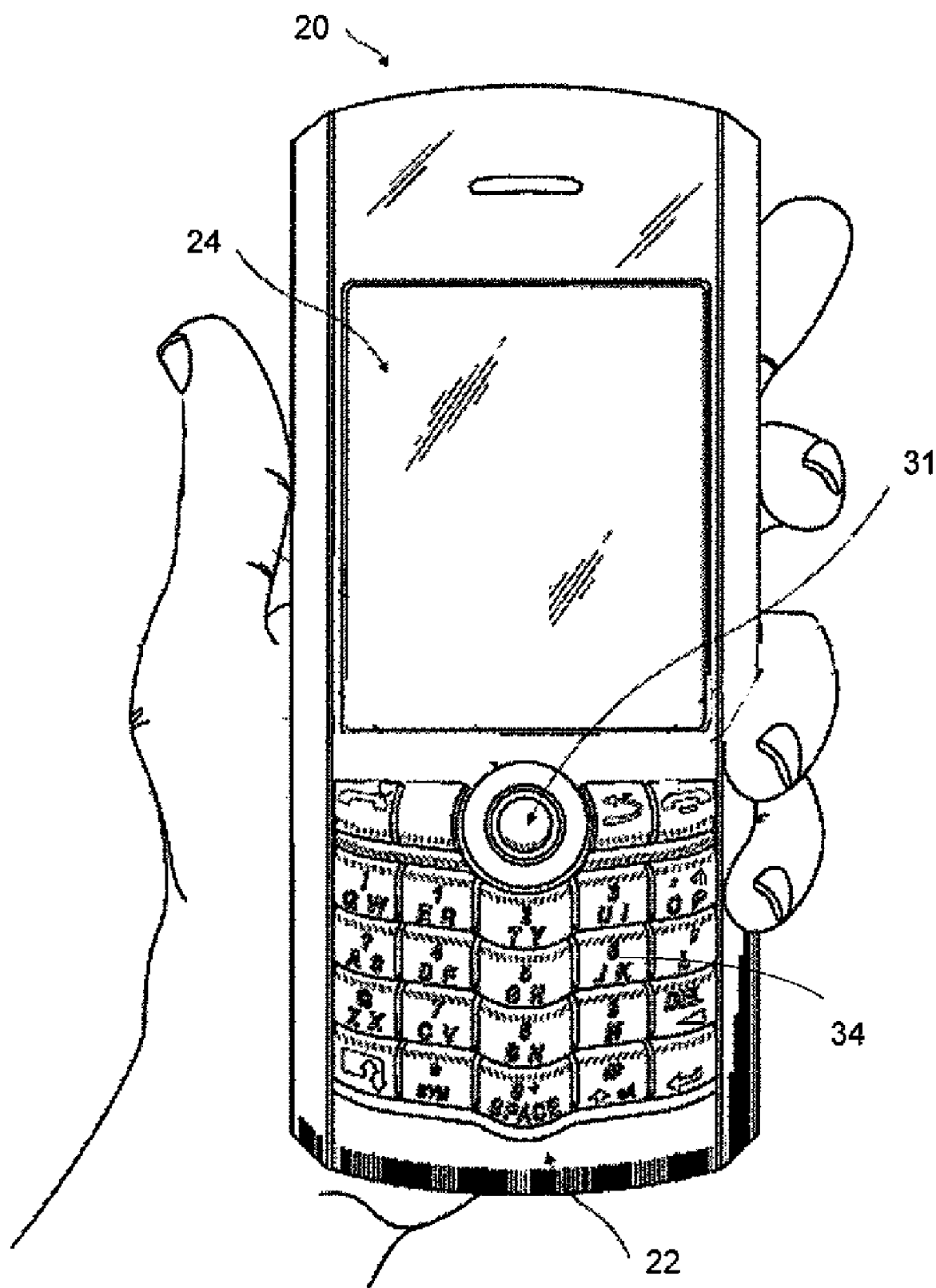
FIG. 11 is a front view of another exemplary portable electronic device.

It will be appreciated that the portable electronic device of FIG. 1 is shown for exemplary purposes only. Other portable electronic devices such as that shown in FIG. 11 are possible. Referring to FIG. 11, another exemplary portable electronic device 20 is shown. The portable electronic device 20 includes a housing 22 that frames an LCD display 24. In the present example, however, the portable electronic device 20 includes a trackball 31, rather than a trackwheel. The trackball can be depressed as a means to provide additional user-input. The microprocessor 38 receives input from the trackball 31 which is used for user selection of features from a list or a table on the LCD display 24 of the portable electronic device 22. Selection is carried out by rolling the trackball to roll a cursor (or highlighted region), for example, to the desired selection and pressing inwardly on the trackball. The portable electronic device 20 shown in FIG. 11 includes many other features, including, for example, a key pad 34 and other features similar to those described above with reference to FIG. 1. It will also be appreciated that reference is made to a trackwheel in the above description for exemplary purposes only, and a trackball 31 such as that shown in FIG. 11 can be used.

According to one aspect there is provided a method of controlling an electronic device. The method includes retrieving from at least one database of the electronic device, calendared events that meet a set of constraints, displaying the calendared events in a time-ordered list including a start date/time of each of the calendared events, and providing a user-selectable option to either show end times or to hide the end times in the time-ordered list. The time-ordered list includes an end date/time of each of the calendared events when the user-selectable option is set to show end times.

According to another aspect, there is provided an electronic device. The electronic device includes a memory for storage of a plurality of calendared events in at least one database, a display device for displaying the calendared events in a list, a user input device for user selection and manipulation of the calendared events, and a processor connected to the memory, the display device and the user input device, for retrieving from at least one database of the electronic device, calendared events that meet a set of constraints, displaying on the display, the calendared events in a time-ordered list including a start date/time of each of the calendared events, and providing a user-selectable option to either show end times or to hide the end times in the time-ordered list. The time-ordered list includes an end date/time of each of the calendared events when the user-selectable option is set to show end times.

According to another aspect, there is provided a computer program product for displaying a plurality of calendared events in a list on a display of an electronic device. The computer program product includes a computer-readable medium having computer-readable code embodied therein for retrieving from at least one database of the electronic device, calendared events that meet a set of constraints, displaying the calendared events in a time-ordered list including a start date/time of each of the calendared events, and providing a user-selectable option to either show end times or to hide the end times in the time-ordered list. The time-ordered list includes an end date/time of each of the calendared events when the user-selectable option is set to show end times.

A user-selectable option is provided for showing end times of the calendared events or hiding end times of the calendared events. When the user-selectable option is set to show end times, end date/times of calendar events are shown. Further, free time periods in which calendared events are not scheduled are determined. The calendared events are provided to the user along with the free time periods in a time-ordered list that shows end date/times of both the calendared events and the free time periods when the user-selectable option is set to show end times. The user can therefore easily determine a schedule including end times and can easily determine appropriate starting times for new appointments. A quick, "at a glance" view of the list provides information to the user, explicitly showing start date/time and end date/time of each of the calendar events.

While embodiments described herein are directed to particular implementations of the method for controlling an electronic device, it will be understood that modifications and variations to these embodiments are within the scope and sphere of the present application. For example, it will be appreciated that the display attributes shown for the free time periods can be user-selected to suit the individual user as described with reference to FIG. 7. Further font attributes can be user selected including, for example, the font colour. Also, although the calendared events that are retrieved at step 50 of FIG. 4 are described as being retrieved from one database, the calendared events can, in fact, be retrieved from a number of databases. Referring again to FIG. 7, one option shown in the submenu of FIG. 7 is the option to Show Tasks. Thus, tasks that are entered using the Tasks application can be shown in the calendar view by retrieving from both a tasks database and a calendar database. Further still, multiple calendar databases that correspond to different calendar accounts synchronized or transferred to the portable electronic device can be maintained. With multiple calendar databases, the calendared events can be retrieved from any or all of the databases.

Many other modifications and variations may occur to those skilled in the art. All such modifications and variations are believed to be within the sphere and scope of the present application.

The invention claimed is:

1. A method of controlling a display of a portable electronic device, the method comprising:
   retrieving from at least one database of said portable electronic device, calendared events that meet a set of constraints;
   displaying on said display a first agenda view of a first set of said calendared events in a first time-ordered list; said first time-ordered list including a start date/time of each of said calendared events and omitting any reference to an end date/time of each said calendared events;
   providing a user-selectable option to either show end times or to hide said end times in said time-ordered list;
   receiving a first input data representative of a selection of said user-selectable option;
   receiving a second input data representative of an exit command, responsive to said second input, incorporating an end date/time for each of said calendared events when said first input data equals data representative of user-selectable option is set to show end times; and,
   displaying on said display a second agenda view in a second time-ordered list; said second time-ordered list including a start date/time and an end date/time for each of said calendared events;
   wherein said first time-ordered list shows a greater number of said calendared events on said display than said second time-ordered list due to the omitting of any reference to said end date/time in said first time-ordered list.

2. The method according to claim 1, comprising determining free time periods absent of said calendared events prior to said displaying on said display said first agenda view and wherein said displaying on said display said first agenda view comprises displaying said calendar events and at least some of said free time periods in said first time-ordered list.

3. The method according to claim 2, wherein said determining comprises determining for each of said free time periods, a start date/time and an end date/time.

4. The method according to claim 3, wherein said determining comprises calculating a duration of each of said free time periods by subtracting said start date/time from said end date/time.

5. The method according to claim 4, wherein when said first input data equals data representative of user-selectable option is set to hide end times, said displaying on said display a second agenda view comprises displaying said second time-ordered list including a start date/time and a duration of each of said free time periods when said user-selectable option is set to hide said end times.

6. The method according to claim 4, comprising comparing said duration of each of said free time periods to a minimum duration prior to said displaying, wherein said displaying on said display said first agenda view comprises displaying said calendared events and only those free time periods that are equal to or greater in duration than said minimum duration.

7. The method according to claim 4, wherein said start date/time of each said free time period is based on one of a configured start time of a calendar day, an end date/time of a non-conflicting calendared event and a latest end date/time of a set of conflicting calendared events.

8. The method according to claim 7, wherein said end date/time of each said free time period is based on one of a configured end time of a calendar day, a start date/time of the next one of said non-conflicting calendared events and an earliest start date/time of a next set of conflicting calendared events.

9. The method according to claim 8, wherein said displaying on said display said first agenda view comprises displaying said at least some of said free time periods with a user-selectable display attribute.

10. The method according to claim 8, wherein said displaying on said display said first agenda view comprises displaying said at least some of said free time periods with a display attribute different from that of said calendared events.

11. The method according to claim 8, wherein said determining free time periods comprises determining only those free time periods that are on or after the current date/time according to a clock at the portable electronic device.

12. A computer program product for displaying a plurality of calendared events in a list on a display of portable electronic device, said computer program product comprising a non-transitory computer readable storage medium having a computer-readable program code adapted to be executed to implement a method of controlling said display, the method comprising:

retrieving from at least one database of said portable electronic device, calendared events that meet a set of constraints;

displaying on said display a first agenda view of a first set of said calendared events in a first time-ordered list; said first time-ordered list including a start date/time of each of said calendared events and omitting any reference to an end date/time of each said calendared events;

providing a user-selectable option to either show end times or to hide said end times in said time-ordered list;

receiving a first input data representative of a selection of said user-selectable option;

receiving a second input data representative of an exit command, responsive to said second input, incorporating an end date/time for each of said calendared events when said first input data equals data representative of user-selectable option is set to show end times; and displaying on said display a second agenda view in a second time-ordered list; said second time-ordered list including a start date/time and an end date/time for each of said calendared events;

wherein said first time-ordered list shows a greater number of said calendared events on said display than said second time-ordered list due to the omitting of any reference to said end date/time in said first time-ordered list.

* * * * *